United States Patent
Chew et al.

(10) Patent No.: US 11,228,480 B2
(45) Date of Patent: Jan. 18, 2022

(54) GATEWAY ASSISTED DIAGNOSTICS AND REPAIR

(71) Applicant: Intel Corporation, Santa Clara, CA (US)

(72) Inventors: Yen Hsiang Chew, Bayan Lepas (MY); Kanapathy Murugayah, Penang (MY); Jose Avalos, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/389,961

(22) Filed: Dec. 23, 2016

(65) Prior Publication Data

US 2018/0183653 A1 Jun. 28, 2018

(51) Int. Cl.
*H04L 12/24* (2006.01)
*H04L 12/66* (2006.01)
*H04L 29/06* (2006.01)

(52) U.S. Cl.
CPC .......... *H04L 41/0654* (2013.01); *H04L 12/66* (2013.01); *H04L 69/22* (2013.01); *H04L 41/046* (2013.01)

(58) Field of Classification Search
CPC ............... H04L 41/0654; H04L 41/046; H04L 41/0672; H04L 41/0853; H04L 41/0609; H04L 41/0659; H04L 41/5038; H04L 67/42; H04L 12/66; H04L 69/22; H04L 69/40; H04L 43/50; H04L 43/065; H04L 43/0847; G06F 11/079; G06F 11/0793; G06F 11/0778; G06F 11/3664; G06F 11/1438; G06F 11/1441; G06F 9/4416
See application file for complete search history.

(56) References Cited

U.S. PATENT DOCUMENTS

| | | | | |
|---|---|---|---|---|
| 6,487,677 B1 * | 11/2002 | Jantz | ................... | G06F 11/0748 714/2 |
| 8,024,618 B1 * | 9/2011 | Margolis | ............. | H04L 43/0811 714/43 |
| 9,032,098 B2 * | 5/2015 | Van De Poel | .......... | H04L 12/66 709/249 |
| 2004/0039757 A1 * | 2/2004 | McClure | ................ | G06Q 10/10 |
| 2008/0267208 A1 * | 10/2008 | Sevier | ..................... | H04L 49/90 370/429 |

(Continued)

OTHER PUBLICATIONS

"International Application Serial No. PCT US2017 062788, International Search Report dated Mar. 8, 2018", 3 pgs.

(Continued)

*Primary Examiner* — Dhairya A Patel
*Assistant Examiner* — Sujana Khakural
(74) *Attorney, Agent, or Firm* — Schwegman Lundberg & Woessner, P.A.

(57) ABSTRACT

System and techniques for gateway assisted diagnostics and repair are described herein. A request for assistance may be received from a client device at a gateway device attached to a local area network (LAN) and a wide area network (WAN). The request for assistance may include an indication of an event experienced by the client device. The request for assistance may be forwarded to a management controller of the gateway device. Instructions may be transmitted to the client device via the LAN for resolving the event experienced by the client device.

19 Claims, 5 Drawing Sheets

(56) References Cited

U.S. PATENT DOCUMENTS

| | | | |
|---|---|---|---|
| 2010/0169392 A1* | 7/2010 | Lev Ran | H04L 67/06 |
| | | | 707/827 |
| 2011/0228665 A1* | 9/2011 | Kumar | H04L 12/2825 |
| | | | 370/216 |
| 2012/0282899 A1 | 11/2012 | Parmar et al. | |
| 2013/0151893 A1 | 6/2013 | Gorecha et al. | |
| 2013/0179593 A1* | 7/2013 | Dunlap | H04L 63/0209 |
| | | | 709/244 |
| 2015/0195247 A1 | 7/2015 | Onogawa et al. | |
| 2016/0285676 A1 | 9/2016 | Kerpez et al. | |
| 2017/0070380 A1* | 3/2017 | Bajpai | H04L 43/0811 |
| 2017/0075698 A1* | 3/2017 | Zamir | H04L 67/06 |
| 2017/0111249 A1* | 4/2017 | Hardt | H04L 43/16 |
| 2018/0063079 A1* | 3/2018 | Ding | H04L 63/0464 |
| 2018/0063080 A1* | 3/2018 | Lehmann | G06F 9/452 |
| 2018/0131751 A1* | 5/2018 | Jones | H04L 67/2833 |

OTHER PUBLICATIONS

"International Application Serial No. PCT US2017 062788, Written Opinion dated Mar. 8, 2018", 9 pgs.
"International Application Serial No. PCT US2017 062788, International Preliminary Report on Patentability dated Jul. 4, 2019", 11 pages.

* cited by examiner

GATEWAY ASSISTED DIAGNOSTICS AND REPAIR

TECHNICAL FIELD

Embodiments described herein generally relate to computer diagnostics and repair and, in some embodiments, more specifically to gateway assisted diagnostics and repair.

BACKGROUND

Computer networks are comprised of a collection of computing devices and network equipment. Computing devices sometimes develop issues or failures that may be unrecoverable without assistance. Client management systems may aid a computing device in recovering from an issue or failure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Out of band remote management of a computing client may be accomplished through the use of a management controller (e.g., a management engine or security co-processor, a desktop and mobile architecture for system hardware (DASH) compliant network interface card (NIC), etc.) coupled to the computing client and a remote management console (e.g., active management technology (AMT), Mesh-Central, DASH, etc.). When a computing client system is down (e.g., due to a hard disk crash, etc.) the remote management console may issue some diagnostics commands to the computing client (e.g., remotely run a set of diagnostic programs, etc.) through an out of band management controller. In some examples, the management console may invoke the computing client to perform a boot redirection and boot an OS image from remote network storage.

Remote diagnostics and remote boot may take a significant amount of time as the diagnostic program or boot image may be executed by the computing client through a network from the remote storage location. For example, booting a recovery operating system (OS) and/or tool platform (e.g., Windows PE, etc.) from a remote image from the remote storage location may take more than 30 minutes on a low bandwidth network or if there is a network bottleneck between the remote storage that contains the image and the computing client. In some cases, excessive network latencies or a network disruption may cause the boot process to timeout or fail.

These performance issues may be reduced by enabling a gateway (e.g., edge network device, router, fog gateway, etc.) to assist in remote diagnostic and repair of its local area network (LAN) connected client computing devices to reduce the time needed to diagnose and fix computing client issues and to increase the remote management capabilities and reliability of a remote management solution.

When a client computing device that is connected to a gateway's LAN interface is provisioned (e.g., provisioned for AMT remote management, etc.) the client computing device may store some diagnostics and system repair applications and a backup OS image in a local storage of the gateway. When a management controller of the client computing device detects an issue with the client computing device (e.g., a boot failure, a crash, etc.), the management controller automatically invokes the client computing device to transmit a client initiated request for assistance (CIRA) to a gateway for the client computing device's LAN. The in response to the CIRA, the gateway may assist the client computing device to perform one or more of following: run a first level diagnostic and system repair application from the local storage of the gateway and try to resolve the issue, redirect the client computing device to boot an OS using a backup image in the local storage of the gateway, raise an alarm to a remote management console or an IT administrator to remotely run additional diagnostics and repair the client computing device. In some embodiments, the management controller may transmit a CIRA to the gateway causing an application processor of the gateway to execute and run a diagnostics and repair application stored in its local storage to fix the faulty client computing device.

The client computing device may communicate with its LAN gateway through a unique communication channel wherein the gateway is configured to snoop/filter for management network packets that come from its LAN ports (e.g., from managed client computing devices that connected to the gateway's LAN network interfaces rather that from devices connected to its WAN network interfaces) targeting a reserved management port number (e.g., a reserved AMT redirection port, etc.).

The systems and techniques described herein provide automatic first level diagnostics and self-repair of managed client computing devices (e.g., from a CIRA utilizing a gateway that is in close network proximity to the managed client, etc.) before the client raises an alarm to a remote administrator. This differs from conventional systems that may immediately raise an alarm to an administrator when an issue is detected (e.g., the client computing device consistently failed to boot, crashes, etc.).

By providing the ability to store diagnostic and repair data in local storage of the gateway, a client computing device's vendor may be provided with a value added option to store device specific diagnostics and repair programs as well as a backup OS image of the device in a storage location that is in close network proximity to the client computing device instead of having to store them on a remote cloud network storage of the vendor or a reserved partition of the client computing device's hard drive. Thus, the client computing device is able to perform automatic self-diagnostics and repair using the vendor provided diagnostics and repair application even when its hard drive fails and all reserved partitions are non-accessible or when the vendor's cloud network storage is temporarily non-accessible due to network issues. Storing diagnostics and repair programs and backup OS images in a local storage location of the gateway that is in close network proximity to the client computing device (e.g., on a closest LAN gateway to where the managed client computing device is connected) may reduce the time to diagnose and repair a client computing device.

Furthermore, more sophisticated diagnostics and repair programs may be enabled to be stored in the local storage of the gateway to perform a more holistic diagnostic and repair of a client computing device. In conventional client management systems, diagnostic programs may be kept simple because keeping the diagnostic program simple reduces the overall time needed for a client computing device to execute a diagnostic test from a remote storage location. Because storing diagnostic and repair data in local storage of a gateway in the client computing device's LAN enables a diagnostic test to be executed with reduced time, more holistic tests or larger (e.g., more complete) OS images may be used for diagnosing and fixing the client computing device. Reliance on dependencies for fast and reliable diagnostics and repair of a client computing device such as WAN network efficiency and reliability may be reduced through the systems and techniques described herein. Thus, fast and reliable first level diagnostics of a client computing device dependencies may be reduced to LAN network efficiency and reliability.

Figure 1:
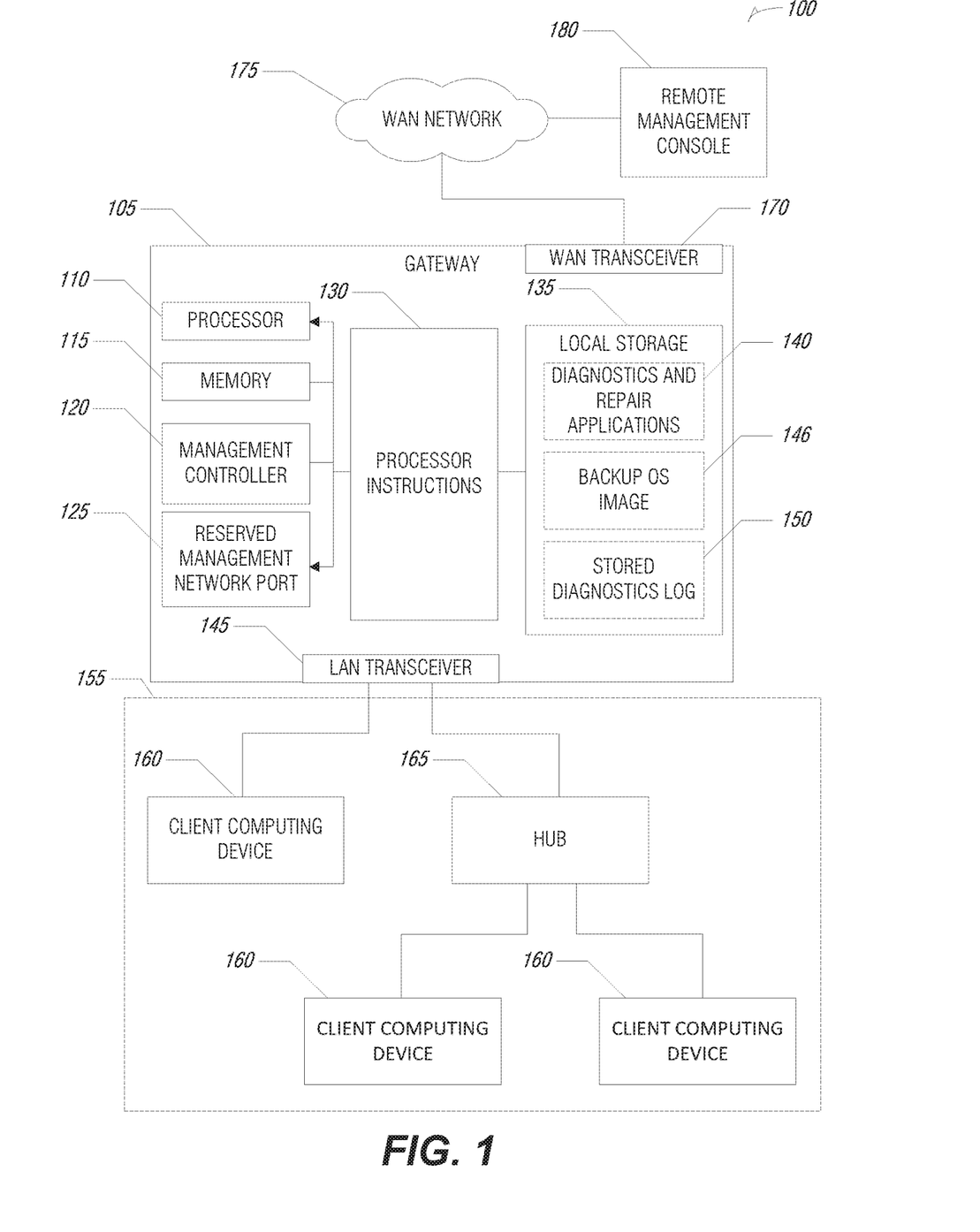
FIG. 1 is a block diagram of an example of a system for gateway assisted diagnostics and repair, according to an embodiment.

FIG. 1 is a block diagram of an example of a system 100 for gateway assisted diagnostics and repair, according to an embodiment. The system 100 may include a gateway 105 (e.g., router, edge gateway, fog gateway, wireless router, internet of things (IoT) gateway, etc.). The gateway 105 may provide network connectivity between client computing devices 160 connected to a local area network (LAN) 155 to devices accessible over a wide area network (WAN) 175. The LAN 155 may be a network interconnecting a variety of client computing devices 160 and may be a wired or wireless network. The client computing devices 160 may include a variety of devices including desktop computers, server computers, laptop computers, IoT devices, fog devices, tablet devices, smartphones, wearable devices, embedded computing devices etc. The WAN 175 may provide connectivity to a variety of devices outside of the LAN 155 such as for example, another gateway, an IoT device, other computing devices, etc.

Figure 5:
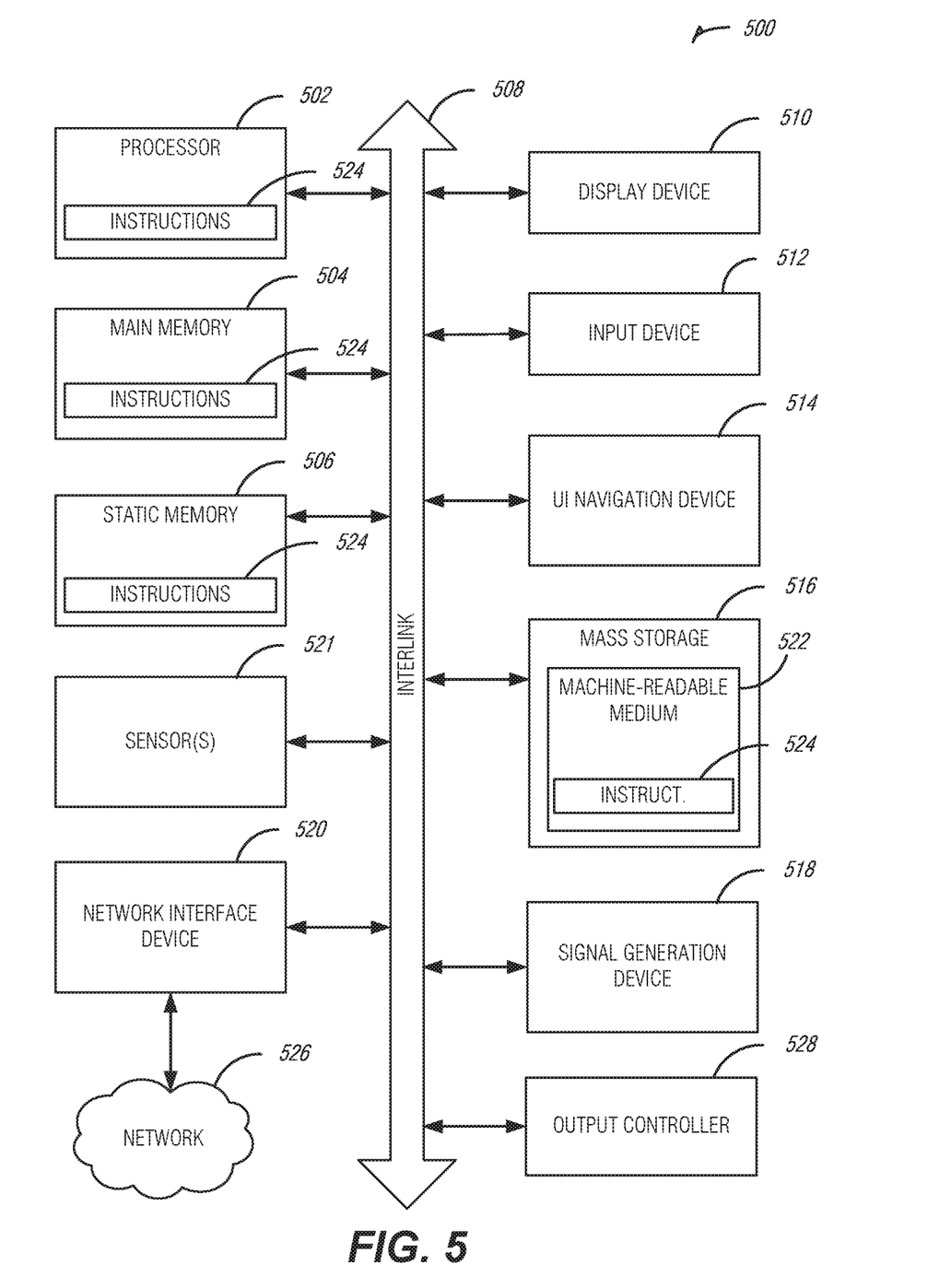
FIG. 5 is a block diagram illustrating an example of a machine upon which one or more embodiments may be implemented.

The gateway 105 may include a variety of components including a processor 110 (e.g., processor 502 as described in FIG. 5, etc.), a memory 115 (e.g., main memory 504 as described in FIG. 5, static memory 506 as described in FIG. 5, etc.), a management controller 120, reserved management network port 125, processor instructions 130 (e.g., instructions 524 as described in FIG. 5, etc.), local storage 135 (e.g., mass storage 516 as described in FIG. 5, etc.), a local area network transceiver 145 (e.g., network interface device 520 as described in FIG. 5, etc.), and a WAN transceiver 170 (e.g., network interface device 520 as described in FIG. 5, etc.).

The local storage 135 may store a variety of data used in delivering gateway assisted diagnostics and repair such as diagnostics and repair applications 140, backup operating system (OS) image 146, an stored diagnostics log 150. The diagnostics and repair applications 140 may include a variety of software applications used that may be run on a client computing device (e.g., a client computing device of client computing devices 160) to diagnose and repair issues (e.g., failures, crashes, etc.) with the client computing device 160. For example, a hard drive consistency checking and repair application may be stored for diagnosing and repairing a hard drive of the client computing device 160. The backup OS image may include software images for restoring the OS to the client computing device 160 and/or for booting the client computing device 160 with a temporary OS used to running diagnostic and repair applications. For example, an image may be stored that, when applied to the client computing device 160, restores the operating system of the client computing device 160 to an originally deployed configuration. The stored diagnostics log 150 may include log data from operations conducted between the gateway 105 and a client computing device 160.

The LAN transceiver 145 may connect the LAN 155 to the gateway 105. The LAN 155 may include client computing devices 160 that may be directly connected to the gateway 105 or may be connected to the gateway 105 through a hub 165. The WAN transceiver 170 may connect the gateway 105 to the WAN 175. The WAN 175 may include a remote management console 180. The remote management console 180 may provide diagnostic and repair information to an administrator of the client computing devices 160.

A client computing device 160 may be provisioned for gateway assisted diagnostics and repair with the gateway. The client computing device 160 may include a management controller that is active while power is applied to the computing device. The client computing device's management controller may detect issues with the computing device and communicate requests for assistance to the gateway 105 (e.g., using a transceiver of the client device, etc.). The client computing device 160 is connected to the LAN 155 via the LAN transceiver 145 (e.g., via wired connection, wireless connection, etc.) of the gateway 105. Additional client computing device vendor specific diagnostics and repair applications (e.g., diagnostics and repair applications 140), a backup OS image and/or a tool image (e.g., Windows PE, backup OS image 146, etc.) may be stored in the local storage 135 of the gateway 105. A network port number of the gateway 105 is reserved for remote management network packet filtering and/or reception (e.g., reserved network management port 125). The gateway 105 is configured to snoop and/or filter traffic on the LAN transceiver 145 (or a subset of its LAN ports that are connected to client computing devices 160) for management network packets from client computing devices 160.

Management communication between the client computing device 160 and the gateway 105 may be established using a variety of techniques such as, for example, the client computing device 160 may send a management network packet using its LAN 155 subnet broadcast IP address and the reserved management network port 125 number and the gateway 105 may detect the LAN 155 subnet broadcast address from its LAN 155 port and inspects the port number. If the port number matches the reserved management network port 125 number, the gateway 105 may interpret the packet as a management packet and route the packet to the management controller 120 of the gateway 105 without broadcasting the packet.

In some embodiments, the client computing device 160 may send a management network packet using the WAN 175 network interface IP address of the gateway 105 and the reserved management network port 125 number and the gateway 105 may detect the packet with an IP address of its WAN 175 network interface received from its LAN 155 network port and may inspect the port number. If the port number matches the reserved management network port 125 number, the gateway 105 may interpret the packet as a management packet and route the packet to the management controller 120 of the gateway 105 without further forwarding the network packet through another gateway (e.g., the WAN transceiver 170, etc.).

In some embodiments, the client computing device 160 may send a management network packet (e.g., client initiated request for assistance CIRA, etc.) to the gateway 105 using a unique subnet IP address assigned to its LAN 155 gateway 105 and the reserved management network port 125 number. In some embodiments, the gateway 105 may inspect and/or filter a port number from any incoming network packets from all its LAN 155 ports and route the packets to the management controller 120 of the gateway 105 if the packet port number matches the reserved management network port number 125 irrespective of the network packet's destination IP address. Management network packets with the reserved management network port number 125 received from the WAN 175 network interface of the gateway 105 may be selectively ignored through a fire wall to prevent external hackers from accessing the local storage 135 of the gateway 105.

The LAN transceiver 145 of the gateway 105 may receive (e.g., using the reserved management network port 125, etc.) a request for assistance from a client computing device 160 (e.g., a CIRA, etc.). The request for assistance may include an indication of an event experienced by the client computing device 160. For example, a management controller of the client computing device 160 may determine that the client computing device 160 has failed to boot an OS and the management controller of the client computing device 160 may transmit a CIRA to the gateway 105 including an indication that the OS has failed to load properly.

The request for assistance (e.g., CIRA, etc.) may be forwarded (e.g., by the LAN transceiver 145, etc.) to the management controller 120 of the gateway device 105. The CIRA request including the indication that the client computing device 160 has failed to load an OS may be forwarded to the management controller 120 for processing. The gateway 105 may determine that a CIRA has been received using a variety of techniques. In some examples, the gateway 105 may identify traffic including the reserved management network port 125 number as a request for assistance.

In some examples, a broadcast data packet may be received using a LAN port (e.g., a LAN port of the LAN transceiver 145) of the gateway 105 and the broadcast data packet may be identified as a request for assistance based on a port number (e.g., the reserved management network port 125) included in a header of the broadcast data packet. In an example, the broadcast data packet may be prevented from being forwarded to other LAN ports of the gateway device upon forwarding the request for assistance to the management controller 120. For example, once the packet is identified as a request for assistance the packet may be removed from the network by the gateway 105 to reduce traffic on the LAN 155.

In some examples, a data packet destined for a WAN interface (e.g., WAN transceiver 170) of the gateway 105 may be received (e.g., by the LAN transceiver 145) and the data packet destined for the WAN interface may be identified as a request for assistance based on a port number (e.g., the reserved management network port 125) included in a header of the data packet destined for the WAN interface. In an example, the data packet destined for the WAN interface may be prevented from reaching the WAN interface upon forwarding the request for assistance to the management controller 120. For example, once the packet is identified as a request for assistance the packet may be removed from the network by the gateway 105 to reduce traffic on the WAN 175.

Instructions may be transmitted (e.g., by the LAN transceiver 145, etc.) to the client computing device 160 for resolving the event experienced by the client computing device 160. The processor instructions 130 may include a variety of instruction selection algorithms (e.g., if-then, pattern matching, etc.) that may be used by the management controller 120 to select instructions to transmit to the client computing device 160 based on the event experienced. In an example, the instructions to the client computing device 160 for resolving the event may include instructions to run a diagnostic and repair application from the local storage 135 (e.g., diagnostics and repair applications 140) of the gateway 105. For example, the client computing device 160 may have failed to boot an operating system and the instructions may include a hard drive consistency and repair application that the management controller of the client computing device 160 may run to verify the integrity of the hard drive and repair any issues detected during the consistency check.

In an example, the instructions to the client computing device 160 for resolving the event may include instructions to store diagnostic log files in the local storage 135 (e.g., stored diagnostic log 150) of the gateway 105. For example, a log file containing an identity of the client computing device 160 and the issue experienced may be stored in the local storage 135 of the gateway 105. The stored diagnostic log 150 may be used by an administrator in troubleshooting issues with the client computing devices 160. In some examples, the stored diagnostic log 150 may be transmitted to the remote management console 180 for display on a display device.

In an example, the instructions to the client computing device 160 for resolving the event may include instructions to reboot the client device. For example, the client computing device 160 may have failed to boot the operating system and the instruction may include instructions for the management controller of the client computing device 160 to reboot to reattempt loading the operating system. In an example, the instructions to the client computing device 160 for resolving the event may include instructions to reset the client computing device 160. For example, the client computing device 160 may be configured with firmware configuration options and may be malfunctioning and the instructions transmitted to the client computing device 160 may include instructions to the management controller in the client computing device 160 to reset the client computing device 160 (e.g., to default configuration, factory new configuration, etc.)

In an example, the instructions to the client device for resolving the event may include instructions to boot the client computing device 160 from an operating system image stored in a local storage 135 of the gateway 105. For example, the client computing device 160 may have failed to load the operating system and the instructions may include instructions that cause the management controller of the client computing device 160 to download and boot the client computing device 160 from an operating system image obtained from the gateway 105. In some examples, the image may be used to reinstall the operating system on the client computing device 160. The OS image may be a default and/or standard software configuration for the client computing device 160, upon installation, may return the client computing device 160 to an operational state (e.g., able to boot the operating system, etc.). In another example, the client computing device 160 may be unable to boot to an operating system and the instructions may include instructions to load a utility operating system so that diagnostic and repair applications may be executed on the client computing device 160. For example, the management controller of the client computing device 160 may use a pre-installation operating system to begin installation of a full operating system or to run complex diagnostics on components of the client computing device 160 and the image for the pre-installation environment may be downloaded and used to boot the client computing device 160.

In an example, the instructions to the client computing device 160 for resolving the event may include instructions to boot the client computing device 160 using a diagnostic software package stored in a local storage device 135 of the gateway device 105. For example, the client computing device 160 may have failed to boot and the instruction may include instructions to boot the client using diagnostic software that may perform a series of hardware and software test to determine the source of the failure to boot.

The management controller 120 may receive an indication from the client computing device 160 regarding the success or failure of the instruction to resolve the event. In some examples, a message indicating resolution of the event may be received (e.g., using the LAN transceiver 145). A log of the instructions transmitted to the client computing device 160 may be stored (e.g., by the management controller 120) in the local storage 135 (e.g., in the stored diagnostics log 150) and an indication of the event and the instructions transmitted to the client device may be transmitted to a computing device (e.g., computer, smartphone, tablet, remote management console 180, etc.). For example, an administrator may receive an indication that the client computing device 160 was unable to boot the OS and the client computing device 160 had sent instructions to run a hard drive diagnostic and repair utility resulting in resolution of the event (e.g., the client computing device 160 booted the OS). Thus, the administrator may be provided with information to track the client computing device 160 in the early stages of failure.

In some examples, a message indicating the instructions have not resolved the event may be received (e.g., using the LAN transceiver 145). A log of the instructions transmitted to the client computing device 160 may be stored (e.g., by the management controller 120) in the local storage 135 (e.g., in the stored diagnostics log 150) and an indication of the event, the instructions transmitted to the client device, and an indication that the instructions have not resolved the event may be transmitted to a computing device (e.g., computer, smartphone, tablet, remote management console 180, etc.). For example, the administrator may receive an indication that the client device remains unable to boot the OS and the client device had sent instructions to run a hard drive diagnostic and repair utility which did not resolve the event (e.g., the client computing remains unable to boot the OS). Thus, the administrator may be provided with information to determine next steps in resolving the event.

Figure 2:
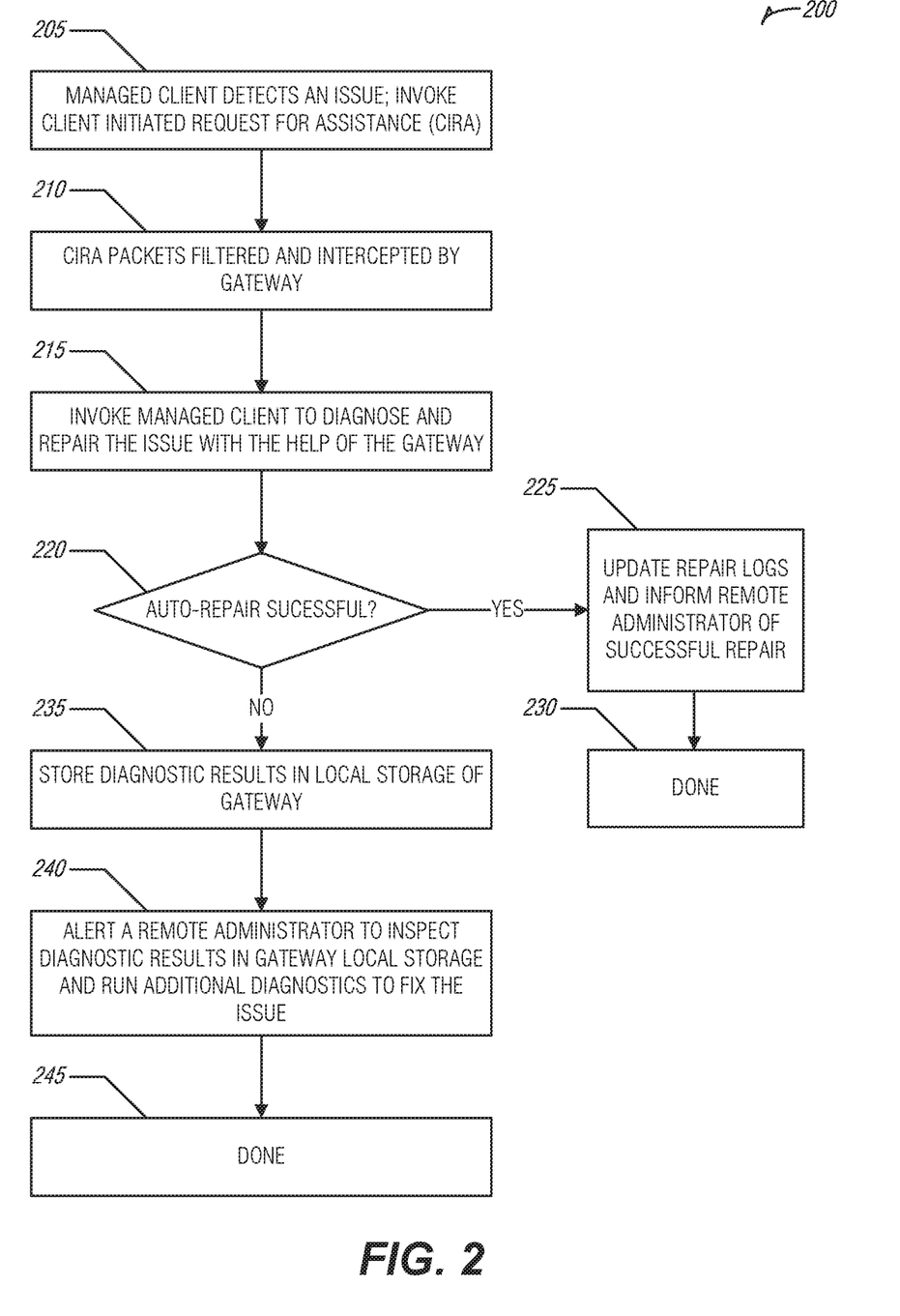
FIG. 2 illustrates a flow diagram of an example of a process for gateway assisted diagnostics and repair, according to an embodiment.

FIG. 2 illustrates a flow diagram of an example of a process 200 for gateway assisted diagnostics and repair, according to an embodiment. The process 200 may provide functionality similar to that described in FIG. 1. When an issue (e.g. boot failure or crash) is detected on a managed client computing device 160 (e.g., a client computing device 160 of the client computing devices 160 as described in FIG. 1) a management controller coupled to client computing device detects the issue and performs the following operations.

At operation 205, the management controller invokes the client computing device to request for help (e.g. through a fast call for help or client initiated request for assistance (CIRA) feature configured on the managed client)

At operation 210, CIRA packets may be sent with a user defined internet protocol (IP) address targeting PORT_M (e.g., reserved management network port 125 as described in FIG. 1) to the ingress LAN port (e.g., a port of the LAN transceiver 145 as described in FIG. 1) of the a gateway (e.g., the gateway 105 as described in FIG. 1).

At operation 215, the gateway filters the request for help packets from its LAN network interface connected to one of its managed client and invokes its managed client to perform one or more of the following action items: run a diagnostic and repair application from the local storage (e.g., local storage 135 as described in FIG. 1) of the gateway and try to resolve the issue, store diagnostics log files in the local storage of the gateway, reboot or reset the client computing system, boot a backup OS/tools image from the local storage of the gateway, any other user defined actions to utilize the gateway to assist in diagnosing and repairing the managed client.

At decision 220, it is determined if the auto-repair task utilizing the gateway was successful. If the auto-repair was successful, the management controller continues to operation 225. For example, the management controller of the client computing device may monitor the boot cycle of the client computing device and may determine that the operating system has now booted. In another example, the management controller of the client computing device may monitor a configuration option of the client computing device and may determine that the configuration option is now set to a functioning value. At operation 225, the repair logs are updated and a remote administrator is informed of the successful repair and the operation terminates at 230.

If it is determined at decision 220 that the auto-repair was not successful, the management controller continues to operation 235. At operation 235, diagnostic results are stored in the local storage of the gateway device. If client computing device is not able to resolve the issue with the help of the gateway, then it may proceed, at operation 240, to alert a remote administrator to perform additional diagnostics on the faulty client computing device. After operation 240 is completed, the process 200 may be complete and may end.

In some embodiments, diagnostic results and logs may be stored in the local storage of the gateway or a remote storage location as determined by an IT administrator (irrespective of whether the issue can be resolved). The IT administrator may run additional diagnostics and repair applications on the faulty client through a remote management console 180 (e.g. Mesh Central or AMT/DASH compliant management console 180). In some embodiments, the IT administrator may utilize the diagnostic results stored in the local storage of the gateway to determine the next course of action to take to repair the managed client. In some embodiments, the IT administrator may push additional diagnostics and repair applications or a more complete OS image into the local storage of the gateway and invoke the client computing system to rerun the updated diagnostics and repair applications, or reboot using the updated OS image from the local storage of the gateway.

Figure 3:
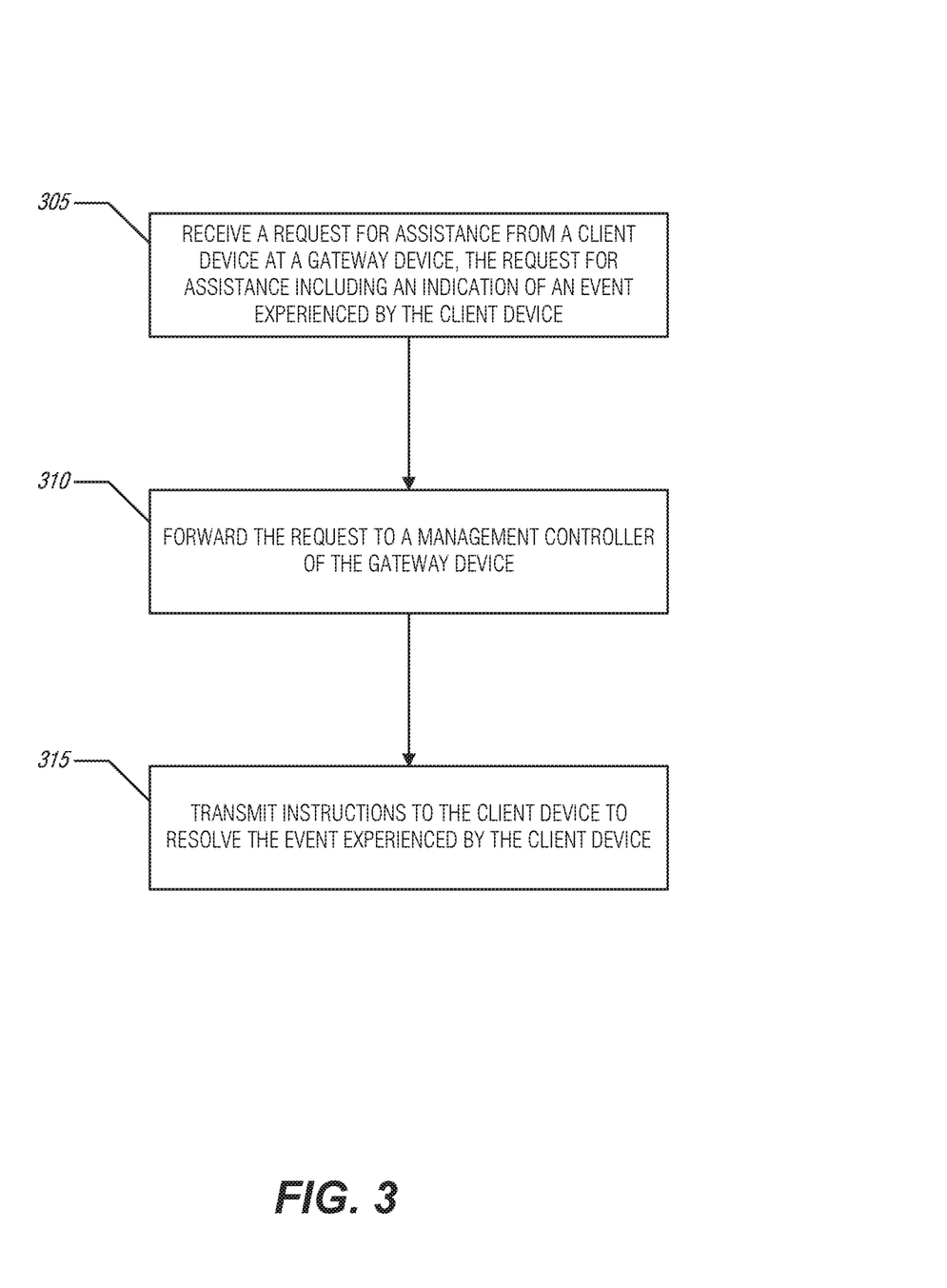
FIG. 3 illustrates an example of a method for gateway assisted diagnostics and repair, according to an embodiment.

FIG. 3 illustrates an example of a method 300 for gateway assisted diagnostics and repair, according to an embodiment. The method 300 may be used to implement the features discussed in FIG. 1.

At operation 305, a request for assistance may be received from a client device at a gateway device attached to a local area network (LAN) and a wide area network (WAN). The request for assistance may include an indication of an event experienced by the client device.

At operation 310, the request for assistance may be forwarded to a management controller of the gateway device. In some examples, a broadcast data packet may be received using a LAN port of the gateway device and the broadcast data packet may be identified as a request for assistance based on a port number included in a header of the broadcast data packet. In an example, the broadcast data packet may be prevented from being forwarded to other LAN ports of the gateway device upon forwarding the request for assistance to the management controller. In some examples, a data packet may be received that is destined for a WAN interface of the gateway device and the data packet destined for the WAN interface may be identified as a request for assistance based on a port number included in a header of the data packet destined for the WAN interface. In an example, the data packet destined for the WAN interface may be prevented from reaching the WAN interface upon forwarding the request for assistance to the management controller.

At operation 315, instructions may be transmitted via the LAN to the client device for resolving the event experienced by the client device. In some examples, the instructions to the client device for resolving the event may include instructions to run a diagnostic and repair application from a local storage device of the gateway device. In an example, the instructions to the client device for resolving the event may include instructions to store diagnostic log files in a local storage device of the gateway device. In an example, the instructions to the client device for resolving the event may include instructions to reboot the client device. In an example, the instructions to the client device for resolving the event may include instructions to reset the client device. In an example, the instructions to the client device for resolving the event may include instructions to boot the client device from an operating system image stored in a local storage device of the gateway device. In an example, the instructions to the client device for resolving the event may include instructions to boot the client device using a diagnostic software package stored in a local storage device of the gateway device.

In some examples, a message indicating resolution of the event may be received from the client device. A log of the instructions transmitted to the client device may be stored in a local storage device of the gateway device and an indication of the event and the instructions transmitted to the client device may be transmitted to a computing device. In some examples, a message indicating the instructions have not resolved the event may be received from the client device. A log of the instructions transmitted to the client device may be stored in a local storage device of the gateway device and an indication of the event, the instructions transmitted to the client device, and an indication that the instructions have not resolved the event may be transmitted to a computing device.

Figure 4:
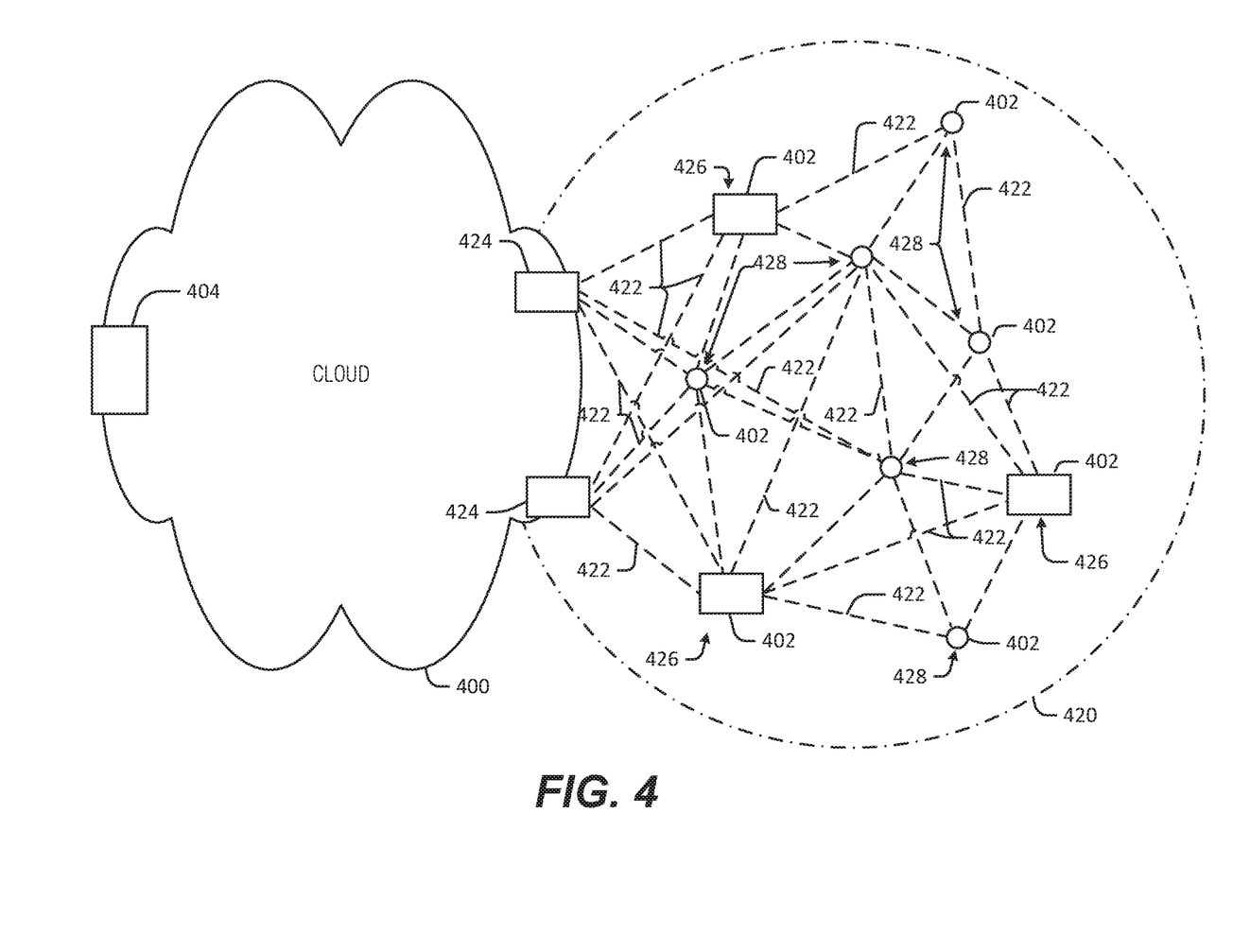
FIG. 4 illustrates an example of a cloud and Internet of Things (IoT) mesh network topology, according to an embodiment.

FIG. 4 is a drawing of a cloud computing network, or cloud 400, in communication with a mesh network of IoT devices 402, that may be termed a fog 420, operating at the edge of the cloud 400, To simplify the diagram, not every IoT device 402 is labeled.

The fog 420 may be considered to be a massively interconnected network wherein a number of IoT devices 402 are in communications with each other, for example, by radio links 422. This may be performed using the open interconnect consortium (OW) standard specification 3.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 402 are shown in this example, gateways 424, data aggregators 426, and sensors 428, although any combinations of IoT devices 402 and functionality may be used. The gateways 424 may be edge devices that provide communications between the cloud 400 and the fog 420, and may also provide the backend process function for data obtained from sensors 428, such as motion data, flow data, temperature data, and the like. The data aggregators 426 may collect data from any number of the sensors 428, and perform the back end processing function for the analysis. The results, raw data, or both may be passed along to the cloud 400 through the gateways 424. The sensors 428 may be full IoT devices 402, for example, capable of both collecting data and processing the data. In some cases, the sensors 428 may be more limited in functionality, for example, collecting the data and allowing the data aggregators 426 or gateways 424 to process the data.

Communications from any IoT device 402 may be passed along the most convenient path between any of the IoT devices 402 to reach the gateways 424. In these networks, the number of interconnections provide substantial redundancy, allowing communications to be maintained, even with the loss of a number of IoT devices 402. Further, the use of a mesh network may allow IoT devices 402 that are very low power or located at a distance from infrastructure to be used, as the range to connect to another IoT device 402 may be much less than the range to connect to the gateways 424.

The fog 420 of these IoT devices 402 devices may be presented to devices in the cloud 400, such as a server 404, as a single device located at the edge of the cloud 400, e.g., a fog 420 device. In this example, the alerts coming from the fog 420 device may be sent without being identified as coming from a specific IoT device 402 within the fog 420.

In some examples, the IOT devices 402 may be configured using an imperative programming style, e.g., with each IOT device 402 having a specific function and communication partners. However, the IOT devices 402 forming the fog 420 device may be configured in a declarative programming style, allowing the IoT devices 402 to reconfigure their operations and communications, such as to determine needed resources in response to conditions, queries, and device failures. As an example, a query from a user located at a server 404 about the operations of a subset of equipment monitored by the IoT devices 402 may result in the fog 420 device selecting the IoT devices 402, such as particular sensors 428, needed to answer the query. The data from these sensors 428 may then be aggregated and analyzed by any combination of the sensors 428, data aggregators 426, or gateways 424, before being sent on by the fog 420 device to the server 404 to answer the query. In this example, IoT devices 402 in the fog 420 may select the sensors 428 used based on the query, such as adding data from flow sensors or temperature sensors. Further, if some of the IoT devices 402 are not operational, other IoT devices 402 in the fog 420 device may provide analogous data, if available.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second. circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and. one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is a method for gateway assisted diagnostics and repair, the method comprising: receiving, at a gateway device attached to a local area network (LAN) and a wide area network (WAN), a request for assistance from a client device, the request for assistance including an indication of an event experienced by the client device; forwarding the request for assistance to a management controller of the gateway device; and transmitting, via the LAN, instructions to the client device for resolving the event experienced by the client device.

In Example 2, the subject matter of Example 1 optionally includes wherein receiving the request for assistance comprises: receiving a data packet using a LAN port of the gateway device; and identifying the data packet as a request for assistance based on a port number included in a header of the broadcast data packet.

In Example 3, the subject matter of Example 2 optionally includes wherein the data packet is a LAN broadcast data packet or a data packet destined for a WAN interface of the gateway device.

In Example 4, the subject matter of any one or more of Examples 2-3 optionally include preventing the data packet from being forwarded to other LAN ports or WAN interfaces of the gateway device upon forwarding the request for assistance to the management controller.

In Example 5, the subject matter of any one or more of Examples 1-4 optionally include rejecting data packets received from the WAN interface of the gateway as a request for assistance.

In Example 6, the subject matter of any one or more of Examples 1-5 optionally include wherein transmitting the instructions to the client device for resolving the event includes transmitting instructions to run a diagnostic and repair application from a local storage device of the gateway device.

In Example 7, the subject matter of any one or more of Examples 1-6 optionally include wherein transmitting the instructions to the client device for resolving the event includes transmitting instructions to store diagnostic log files in a local storage device of the gateway device.

In Example 8, the subject matter of any one or more of Examples 1-7 optionally include wherein transmitting the instructions to the client device for resolving the event includes transmitting instructions to reboot the client device.

In Example 9, the subject matter of any one or more of Examples 1-8 optionally include wherein transmitting the instructions to the client device for resolving the event includes transmitting instructions to reset the client device.

In Example 10, the subject matter of any one or more of Examples 1-9 optionally include wherein transmitting the instructions to the client device for resolving the event includes transmitting instructions to boot the client device from an operating system image stored in a local storage device of the gateway device.

In Example 11, the subject matter of any one or more of Examples 1-10 optionally include wherein transmitting the instructions to the client device for resolving the event includes transmitting instructions to boot the client device using a diagnostic software package stored in a local storage device of the gateway device.

In Example 12, the subject matter of any one or more of Examples 1-11 optionally include receiving, from the client device, a message indicating resolution of the event; storing, in a local storage device of the gateway device, a log of the instructions transmitted to the client device, and transmitting, to a remote computing device over the WAN, an indication of the event and the instructions transmitted to the client device.

In Example 13, the subject matter of any one or more of Examples 1-12 optionally include receiving, from the client device, a message indicating the instructions have not resolved the event; storing, in a local storage device of the gateway device, a log of the instructions transmitted to the client device, and transmitting, to a remote computing device over the WAN, an indication of the event, the instructions transmitted to the client device, and an indication that the instructions have not resolved the event.

Example 14 is a system to implement gateway assisted diagnostics and repair, the system comprising means to perform any method of Examples 1-13.

Example 15 is at least one machine readable medium to implement gateway assisted diagnostics and repair, the at least one machine readable medium including instructions that, when executed by a machine, cause the machine to perform any method of Examples 1-13.

Example 16 is a system for gateway assisted diagnostics and repair, the system comprising: at least one processor; and a memory comprising instructions that, when executed by the at least one processor, cause the at least one processor to perform operations to: receive, at a gateway device attached to a local area network (LAN) and a wide area network (WAN), a request for assistance from a client device, the request for assistance including an indication of an event experienced by the client device; forward the request for assistance to a management controller of the gateway device; and transmit, via the LAN, instructions to the client device for resolving the event experienced by the client device.

In Example 17, the subject matter of Example 16 optionally includes wherein to receive the request for assistance, the operations include instructions to: receive a data packet using a LAN port of the gateway device; and identify the data packet as a request for assistance based on a port number included in a header of the broadcast data packet.

In Example 18, the subject matter of Example 17 optionally includes wherein the data packet is a LAN broadcast data packet or a data packet destined for a WAN interface of the gateway device.

In Example 19, the subject matter of any one or more of Examples 17-18 optionally include operations to prevent the data packet from being forwarded to other LAN ports or WAN interfaces of the gateway device upon forwarding the request for assistance to the management controller.

In Example 20, the subject matter of any one or more of Examples 16-19 optionally include rejecting a data packets received from the WAN interface of the gateway as a request for assistance.

In Example 21, the subject matter of any one or more of Examples 16-20 optionally include wherein the instructions to the client device for resolving the event include instructions to run a diagnostic and repair application from a local storage device of the gateway device.

In Example 22, the subject matter of any one or more of Examples 16-21 optionally include wherein the instructions to the client device for resolving the event include instructions to store diagnostic log files in a local storage device of the gateway device.

In Example 23, the subject matter of any one or more of Examples 16-22 optionally include wherein the instructions to the client device for resolving the event include instructions to reboot the client device.

In Example 24, the subject matter of any one or more of Examples 16-23 optionally include wherein the instructions to the client device for resolving the event include instructions to reset the client device.

In Example 25, the subject matter of any one or more of Examples 16-24 optionally include wherein the instructions to the client device for resolving the event include instructions to boot the client device from an operating system image stored in a local storage device of the gateway device.

In Example 26, the subject matter of any one or more of Examples 16-25 optionally include wherein the instructions to the client device for resolving the event include instructions to boot the client device using a diagnostic software package stored in a local storage device of the gateway device.

In Example 27, the subject matter of any one or more of Examples 16-26 optionally include operations to: receive, from the client device, a message indicating resolution of the event; store, in a local storage device of the gateway device, a log of the instructions transmitted to the client device, and transmit, to a remote computing device over the WAN, an indication of the event and the instructions transmitted to the client device.

In Example 28, the subject matter of any one or more of Examples 16-27 optionally include operations to: receive, from the client device, a message indicating the instructions have not resolved the event; store, in a local storage device of the gateway device, a log of the instructions transmitted to the client device, and transmit, to a remote computing device, an indication of the event, the instructions transmitted to the client device, and an indication that the instructions have not resolved the event.

Example 29 is at least one machine readable medium including instructions for gateway assisted diagnostics and repair that, when executed by a machine, cause the machine to perform: receive, at a gateway device attached to a local area network (LAN) and a wide area network (WAN), a request for assistance from a client device, the request for assistance including an indication of an event experienced by the client device; forward the request for assistance to a management controller of the gateway device; and transmit, via the LAN, instructions to the client device for resolving the event experienced by the client device.

In Example 30, the subject matter of Example 29 optionally includes wherein the instructions to receive the request for assistance include instructions to: receive a broadcast data packet using a LAN port of the gateway device; and identify the broadcast data packet as a request for assistance based on a port number included in a header of the broadcast data packet.

In Example 31, the subject matter of Example 30 optionally includes wherein the data packet is a LAN broadcast data packet or a data packet destined for a WAN interface of the gateway device.

In Example 32, the subject matter of any one or more of Examples 30-31 optionally include operations to prevent the data packet from being forwarded to other LAN ports or WAN interfaces of the gateway device upon forwarding the request for assistance to the management controller.

In Example 33, the subject matter of any one or more of Examples 29-32 optionally include instructions to reject data packets received from the WAN interface of the gateway as a request for assistance.

In Example 34, the subject matter of any one or more of Examples 29-33 optionally include wherein the instructions to the client device for resolving the event include instructions to run a diagnostic and repair application from a local storage device of the gateway device.

In Example 35, the subject matter of any one or more of Examples 29-34 optionally include wherein the instructions to the client device for resolving the event include instructions to store diagnostic log files in a local storage device of the gateway device.

In Example 36, the subject matter of any one or more of Examples 29-35 optionally include wherein the instructions to the client device for resolving the event include instructions to reboot the client device.

In Example 37, the subject matter of any one or more of Examples 29-36 optionally include wherein the instructions to the client device for resolving the event include instructions to reset the client device.

In Example 38, the subject matter of any one or more of Examples 29-37 optionally include wherein the instructions to the client device for resolving the event include instructions to boot the client device from an operating system image stored in a local storage device of the gateway device.

In Example 39, the subject matter of any one or more of Examples 29-38 optionally include wherein the instructions to the client device for resolving the event include instructions to boot the client device using a diagnostic software package stored in a local storage device of the gateway device.

In Example 40, the subject matter of any one or more of Examples 29-39 optionally include operations to: receive, from the client device, a message indicating resolution of the event; store, in a local storage device of the gateway device, a log of the instructions transmitted to the client device, and transmit, to a remote computing device over the WAN, an indication of the event and the instructions transmitted to the client device.

In Example 41, the subject matter of any one or more of Examples 29-40 optionally include operations to: receive, from the client device, a message indicating the instructions have not resolved the event; store, in a local storage device of the gateway device, a log of the instructions transmitted to the client device, and transmit, to a remote computing device, an indication of the event, the instructions transmitted to the client device, and an indication that the instructions have not resolved the event.

Example 42 is a gateway device for gateway assisted diagnostics and repair, the gateway device comprising: at least one processor; a storage device; a local area network (LAN) transceiver; a wide area network (WAN) transceiver; a management controller; and a memory comprising instructions that, when executed by the at least one processor, cause the at least one processor to perform operations to: receive a request for assistance from a client device, the request for assistance including an indication of an event experienced by the client device; forward the request for assistance to the management controller; and transmit, via the LAN transceiver, instructions to the client device for resolving the event experienced by the client device.

In Example 43, the subject matter of Example 42 optionally includes wherein to receive the request for assistance, the operations include instructions to: receive a data packet using, via the LAN transceiver; and identify the data packet as a request for assistance based on a port number included in a header of the broadcast data packet.

In Example 44, the subject matter of Example 43 optionally includes wherein the data packet is a LAN broadcast data packet or a data packet destined for a WAN interface of the gateway device.

In Example 45, the subject matter of any one or more of Examples 43-44 optionally include operations to prevent the data packet from being forwarded to other client devices on the LAN or WAN interfaces upon forwarding the request for assistance to the management controller.

In Example 46, the subject matter of any one or more of Examples 42-45 optionally include operations to reject data packets received from the WAN interface of the gateway as a request for assistance.

In Example 47, the subject matter of any one or more of Examples 42-46 optionally include wherein the instructions to the client device for resolving the event include instructions to run a diagnostic and repair application from the storage device.

In Example 48, the subject matter of any one or more of Examples 42-47 optionally include wherein the instructions to the client device for resolving the event include instructions to store diagnostic log files in the storage device.

In Example 49, the subject matter of any one or more of Examples 42-48 optionally include wherein the instructions to the client device for resolving the event include instructions to reboot the client device.

In Example 50, the subject matter of any one or more of Examples 42-49 optionally include wherein the instructions to the client device for resolving the event include instructions to reset the client device.

In Example 51, the subject matter of any one or more of Examples 42-50 optionally include wherein the instructions to the client device for resolving the event include instructions to boot the client device from an operating system image stored in the storage device.

In Example 52, the subject matter of any one or more of Examples 42-51 optionally include wherein the instructions to the client device for resolving the event include instructions to boot the client device using a diagnostic software package stored in the storage device.

In Example 53, the subject matter of any one or more of Examples 42-52 optionally include operations to: receive, from the client device, a message indicating resolution of the event; store, in the storage device, a log of the instructions transmitted to the client device, and transmit, to a remote computing device over the WAN, an indication of the event and the instructions transmitted to the client device.

In Example 54, the subject matter of any one or more of Examples 42-53 optionally include operations to: receive, from the client device, a message indicating the instructions have not resolved the event; store, in the storage device, a log of the instructions transmitted to the client device, and transmit, to a remote computing device, an indication of the event, the instructions transmitted to the client device, and an indication that the instructions have riot resolved the event.

Example 55 is an apparatus for gateway assisted diagnostics and repair, the apparatus comprising: means for receiving, at a gateway device attached to a local area network (LAN) and a wide area network (WAN), a request for assistance from a client device, the request for assistance including an indication of an event experienced by the client device; means for forwarding the request for assistance to a management controller of the gateway device; and means for transmitting, via the LAN, instructions to the client device for resolving the event experienced by the client device.

In Example 56, the subject matter of Example 55 optionally includes wherein the means for receiving the request for assistance comprises: means for receiving a data packet using a LAN port of the gateway device; and means for identifying the data packet as a request for assistance based on a port number included in a header of the broadcast data packet.

In Example 57, the subject matter of Example 56 optionally includes wherein the data packet is a LAN broadcast data packet or a data packet destined for a WAN interface of the gateway device.

In Example 58, the subject matter of any one or more of Examples 56-57 optionally include means for preventing the data packet from being forwarded to other LAN ports or WAN interfaces of the gateway device upon forwarding the request for assistance to the management controller.

In Example 59, the subject matter of any one or more of Examples 55-58 optionally include means for rejecting data packets received from the WAN interface of the gateway as a request for assistance.

In Example 60, the subject matter of any one or more of Examples 55-59 optionally include wherein the instructions to the client device for resolving the event include instructions to run a diagnostic and repair application from a local storage device of the gateway device.

In Example 61, the subject matter of any one or more of Examples 55-60 optionally include wherein the instructions to the client device for resolving the event include instructions to store diagnostic log files in a local storage device of the gateway device.

In Example 62, the subject matter of any one or more of Examples 55-61 optionally include wherein the instructions to the client device for resolving the event include instructions to reboot the client device.

In Example 63, the subject matter of any one or more of Examples 55-62 optionally include wherein the instructions to the client device for resolving the event include instructions to reset the client device.

In Example 64, the subject matter of any one or more of Examples 55-63 optionally include wherein the instructions to the client device for resolving the event include instructions to boot the client device from an operating system image stored in a local storage device of the gateway device.

In Example 65, the subject matter of any one or more of Examples 55-64 optionally include wherein the instructions to the client device for resolving the event include instructions to boot the client device using a diagnostic software package stored in a local storage device of the gateway device.

In Example 66, the subject matter of any one or more of Examples 55-65 optionally include means for receiving, from the client device, a message indicating resolution of the event; means for storing, in a local storage device of the gateway device, a log of the instructions transmitted to the client device, and means for transmitting, to a remote computing device over the WAN, an indication of the event and the instructions transmitted to the client device.

In Example 67, the subject matter of any one or more of Examples 55-66 optionally include means for receiving, from the client device, a message indicating the instructions have not resolved the event; means for storing, in a local storage device of the gateway device, a log of the instructions transmitted to the client device, and means for transmitting, to a remote computing device, an indication of the event, the instructions transmitted to the client device, and an indication that the instructions have not resolved the event.

Example 68 is a system comprising means for performing the operations of any one or more of examples 1-67.

Example 69 is a non-transitory machine readable medium including instructions that, when executed by a machine cause the machine to perform the operations of any one or more of examples 1-67.

Example 70 is a system configured to perform operations of any one or more of examples 1-67.

Example 71 is a method for performing operations of any one or more of examples 1-67.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for gateway assisted diagnostics and repair, the system comprising:
   at least one processor; and
   a memory comprising instructions that, when executed by the at least one processor, cause the at least one processor to perform operations to:
   receive, at a gateway device attached to a local area network (LAN) and a wide area network (WAN), a data packet via a LAN port of the gateway device, a request for assistance from a client device, the request for assistance including an indication of an event experienced by the client device, wherein the request for assistance is identified in the data packet based on a port number included in a header of the data packet, and wherein the port number is reserved for a management communication channel;
   inspect the data packet to identify that the data packet is destined for a remote management controller on the WAN based on a destination address included in the data packet;
   determine that a management controller of the gateway device is configured to assist the client device with the event experienced by the client device;
   based on the determination that the management controller of the gateway device is configured to assist the client device with the event experienced by the client device, forward the request for assistance to the management controller of the gateway device;
   intercept the data packet from the LAN and the WAN based on the receipt of the request for assistance to prevent the data packet from being transmitted to the remote management controller on the WAN based on the determination that the management controller of the gateway device is configured to assist the client device;
   transmit a software image to the client device, the software image including a diagnostic software package;
   transmit, via the LAN, instructions to the client device for resolving the event experienced by the client device, the instructions causing the client device to execute the diagnostic software package to resolve the event;
   upon determining that the instructions to the client did not resolve the event, create a data log for the event that includes an identification of the event, a description of the instructions to the client, and a status of the client device;
   generate an alarm data packet that includes the data log; and
   transmit the alarm data packet to an administrator of the client device;
   identify that a second data packet received via a WAN interface of the gateway device is from a second client device with a network address not included in a set of network addresses corresponding to the LAN; and
   reject the second data packet upon identification that the second data packet includes a second request for assistance.

2. The system of claim 1, wherein the data packet is a LAN broadcast data packet or a data packet destined for a WAN interface of the gateway device.

3. The system of claim 1, wherein the instructions to filter the data packet further comprise instructions to discard the data packet before the data packet is forwarded to other LAN ports or WAN interfaces of the gateway device upon the request for assistance being forwarded to the management controller.

4. The system of claim 1, wherein the instructions to the client device for resolving the event include instructions to run a diagnostic and repair application from a local storage device of the gateway device.

5. The system of claim 1, wherein the instructions to the client device for resolving the event include instructions to store diagnostic log files in a local storage device of the gateway device.

6. The system of claim 1, wherein the instructions to the client device for resolving the event include instructions to reboot the client device.

7. The system of claim 1, wherein the instructions to the client device for resolving the event include instructions to reset the client device.

8. The system of claim 1, wherein the instructions to the client device for resolving the event include instructions to boot the client device from an operating system image stored in a local storage device of the gateway device.

9. The system of claim 1, wherein the instructions to the client device for resolving the event include instructions to boot the client device using a diagnostic software package stored in a local storage device of the gateway device.

10. The system of claim 1, further comprising operations to:
   receive, from the client device, a message indicating resolution of the event;
   store, in a local storage device of the gateway device, a log of the instructions transmitted to the client device, and transmit, to a remote computing device over the WAN, an indication of the event and the instructions transmitted to the client device.

11. The system of claim 1, further comprising operations to:
   receive, from the client device, a message indicating the instructions have not resolved the event;
   store, in a local storage device of the gateway device, a log of the instructions transmitted to the client device, and
   transmit, to a remote computing device, an indication of the event, the instructions transmitted to the client device, and an indication that the instructions have not resolved the event.

12. A method for gateway assisted diagnostics and repair, the method comprising:
   receiving, at a gateway device attached to a local area network (LAN) and a wide area network (WAN), a data packet via a LAN port of the gateway device, a request for assistance from a client device, the request for assistance including an indication of an event experienced by the client device, wherein the request for assistance is identified in the data packet based on a port number included in a header of the data packet, and wherein the port number is reserved for a management communication channel;
   inspecting the data packet to identify that the data packet is destined for a remote management controller on the WAN based on a destination address included in the data packet;
   determining that a management controller of the gateway device is configured to assist the client device with the event experienced by the client device;
   based on the determination that the management controller of the gateway device is configured to assist the client device with the event experienced by the client device, forwarding the request for assistance to the management controller of the gateway device;
   intercepting the data packet from the LAN and the WAN based on the receipt of the request for assistance to prevent the data packet from being transmitted to the remote management controller on the WAN based on the determination that the management controller of the gateway device is configured to assist the client device;
   transmitting a software image to the client device, the software image including a diagnostic software package;
   transmitting, via the LAN, instructions to the client device for resolving the event experienced by the client device, the instructions causing the client device to execute the diagnostic software package to resolve the event;
   upon determining that the instructions to the client did not resolve the event, creating a data log for the event that includes an identification of the event, a description of the instructions to the client, and a status of the client device;
   generating an alarm data packet that includes the data log; and
   transmitting the alarm data packet to an administrator of the client device;
   identifying that a second data packet received via a WAN interface of the gateway device is from a second client device with a network address not included in a set of network addresses corresponding to the LAN; and
   rejecting the second data packet upon identifying that the second data packet includes a second request for assistance.

13. The method of claim 12, wherein the data packet is a LAN broadcast data packet or a data packet destined for a WAN interface of the gateway device.

14. The method of claim 12, wherein filtering the data packet further comprises instructions to discard the data packet before the data packet is forwarded to other LAN ports or WAN interfaces of the gateway device upon forwarding the request for assistance to the management controller.

15. The method of claim 12, wherein transmitting the instructions to the client device for resolving the event includes transmitting instructions to run a diagnostic and repair application from a local storage device of the gateway device.

16. The method of claim 12, wherein transmitting the instructions to the client device for resolving the event includes transmitting instructions to store diagnostic log files in a local storage device of the gateway device.

17. At least one non-transitory machine readable medium including instructions for gateway assisted diagnostics and repair that, when executed by a machine, cause the machine to perform:
   receive, at a gateway device attached to a local area network (LAN) and a wide area network (WAN), a data packet via a LAN port of the gateway device, a request for assistance from a client device, the request for assistance including an indication of an event experienced by the client device, wherein the request for assistance is identified in the data packet based on a port number included in a header of the data packet, and wherein the port number is reserved for a management communication channel;

inspect the data packet to identify that the data packet is destined for a remote management controller on the WAN based on a destination address included in the data packet;

determine that a management controller of the gateway device is configured to assist the client device with the event experienced by the client device;

based on the determination that the management controller of the gateway device is configured to assist the client device with the event experienced by the client device, forward the request for assistance to the management controller of the gateway device;

intercept the data packet from the LAN and the WAN based on the receipt of the request for assistance to prevent the data packet from being transmitted to the remote management controller on the WAN based on the determination that the management controller of the gateway device is configured to assist the client device;

transmit a software image to the client device, the software image including a diagnostic software package;

transmit, via the LAN, instructions to the client device for resolving the event experienced by the client device, the instructions causing the client device to execute the diagnostic software package to resolve the event;

upon determining that the instructions to the client did not resolve the event, create a data log for the event that includes an identification of the event, a description of the instructions to the client, and a status of the client device;

generate an alarm data packet that includes the data log; and transmit the alarm data packet to an administrator of the client device;

identify that a second data packet received via a WAN interface of the gateway device is from a second client device with a network address not included in a set of network addresses corresponding to the LAN; and reject the second data packet upon identification that the second data packet includes a second request for assistance.

18. The at least one non-transitory machine readable medium of claim 17, wherein the data packet is a LAN broadcast data packet or a data packet destined for a WAN interface of the gateway device.

19. The at least one non-transitory machine readable medium of claim 17, wherein the instructions to filter the data packet further comprise instructions to discard the data packet before the data packet is forwarded to other LAN ports or WAN interfaces of the gateway device upon the request for assistance being forwarded to the management controller.

* * * * *